United States Patent

[11] 3,617,183

| [72] | Inventors | Rill Lewis Grosklos<br>Williamstown, W. Va.;<br>Ralph Eustace Hutcheson, Marietta, Ohio;<br>Earl Robert Whiston, Williamstown, W. Va. |
|---|---|---|
| [21] | Appl. No. | 671,142 |
| [22] | Filed | Sept. 27, 1967 |
| [45] | Patented | Nov. 2, 1971 |
| [73] | Assignee | American Cyanamid Company<br>Stamford, Conn. |

[54] ETHYL AURAMINE SOLUTION
6 Claims, No Drawings

[52] U.S. Cl. .................................................. 8/93, 8/54.2
[51] Int. Cl. ............................................. C09b 67/00
[50] Field of Search .......................................... 8/93, 54.2; 260/566

[56] References Cited
UNITED STATES PATENTS

| 3,132,178 | 5/1964 | Weyker | 260/566 |
| 3,373,199 | 3/1968 | Cohen | 260/566 |
| 3,313,590 | 4/1967 | Deland | 8/55 |

FOREIGN PATENTS

| 1,076,110 | 7/1967 | Great Britain |

*Primary Examiner*—George F. Lesmes
*Assistant Examiner*—B. Bettis
*Attorney*—John L. Sullivan

ABSTRACT: Stable ethyl auramine dye solutions containing from 25 to 40 weight percent real dye are provided by the use of ethylene glycol, diethylene glycol, the monomethyl ether of ethylene glycol or the monoethyl ether of ethylene glycol as the solvent vehicle.

ETHYL AURAMINE SOLUTION

This invention relates to and has for its object the provision of liquid dye compositions. More particularly, it is concerned with highly concentrated solutions of ethyl auramine in ethylene glycol, diethylene glycol and the mono methyl and methyl and mono ethyl ethers of ethylene glycol.

Auramine is a well known dye which for many years has been of commercial importance. More recently, however, the ethyl homolog of auramine, hereinafter referred to as ethyl auramine, has assumed increased importance. Thus, for certain purposes ethyl auramine is preferred over auramine, particularly for the dyeing of paper or other materials used for food wrapping.

Ethyl auramine as used herein designates the compound 4,4'-imidocarbonylbis(N,N-diethylaniline) hydrochloride. It is represented by the formula:

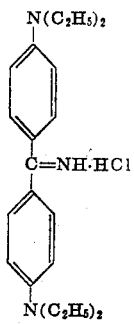

Dyes, such as ethyl auramine, are normally supplied to the market in a powdered form. However, a commercially feasible ethyl auramine solution would be desirable. Thus, liquids are more readily measured on a large scale. Also, such a solution would obviate dusting problems. To be practical, however, the solution should contain a rather high concentration of dye. Also, it must have stability, both chemical and physical, under storage for extended periods of time even under the adverse conditions of high and low temperatures which are sometimes encountered. Thus, for the solution to be practicable, there should be no decomposition or settling out on storage.

The prior art has found that desirable stable solutions of auramine may be prepared using acetic acid as the solvent with auramine base of a low water content. See U.S. Pat. No. 3,209,027. Such solutions can be prepared in high concentration and with the required stability characteristics. However, in the case of ethyl auramine, acetic acid does not provide such solutions.

The present invention is based on the discovery that ethyl auramine solutions of high strength, i.e., over 25 percent and up to about 40 percent real dye content, and having desirable stability characteristics may be prepared using certain specified solvents, viz, ethylene glycol, diethylene glycol, and the mono methyl and mono ethyl ethers of ethylene glycol; provided that the water content of the final solution is not more than about 5.0 percent. It makes no difference whether the water present is due to the water content of the ethyl auramine or the solvent as long as the overall water content of the dye solution does not exceed about 5.0 percent.

As aforeindicated, to be satisfactory for commercial purposes, the high strength dye solutions must exhibit chemical stability, i.e., there should be no appreciable loss of dye strength during the period of shipment and storage prior to use. Also, there should be no appreciable precipitation of the dye or formation of insoluble material. It is not objectionable, however, if some precipitation of dye takes place at low storage temperature, for example at −20° C., provided it redissolves at higher temperatures prior to use. To determine whether the solutions possess sufficient stability a simple test, referred to hereinafter as the "dilute solubility test," may be used. In this test, 2 ml. of a high strength solution when added to 100 ml. of water at 135° F., should result in a substantially clear solution with no precipitation of dye or formation of insoluble material. A solution which successfully meets this test after 30 days storage at room temperature is considered satisfactory for commercial purposes.

It has been found that the stability of the solutions of the invention is enhanced by incorporating a small amount, i.e., 0.05–1.0 percent, of a surfactant or dispersing agent therein. Thus, a preferred solution would have the composition of 36.3 parts of ethyl auramine dye, 63.5 parts of ethylene glycol and 0.2 parts of a dispersing agent, such as the isooctylphenylpolyethoxyelthanol available on the market as "Triton X-100." Apparently, the inclusion of the surfactant increases the tolerance of the dye to the water and salt contents of the dye solutions.

The ethyl auramine used for the solutions of the invention may be prepared by known methods, such as described in U.S. Pat. No. 3,132,178. The auramine process shown in U.S. Pat. No. 3,268,585 may also be applied to ethyl auramine. The isolation process shown in copending application, Ser. No. 594,668, is also applicable. In any case, the ethyl auramine should contain a minimum amount of solvent-insoluble material. In order to achieve this, particularly in instances where the preparational method involves the use of urea, the final isolation procedure should be modified by first washing the wet filter cake of the final product with a dilute brine solution. Also, the water content of the final dye product should be reduced to a point sufficiently low so that when the dye solution is made up the total water concentration of the final solution will not exceed the 5.0 percent limit. Thus, taking into account the normally occuring water contents of the solvents used as obtained commercially, it has been found convenient to bring the water content of the ethyl auramine product to a level of about 1.0 percent or less. Thus, by taking the water content of the dye down to a relatively low level, a relatively higher water content in the solvent can be tolerated.

Since there is a definite tendency for hydrate formation, the drying temperature should be high enough to bring the water content down to the required level within a reasonable time. For this purpose drying temperatures of about 115°–125° C. are suitable. At temperatures below about 100° C., the dye is not dehydrated to the necessary limit.

The use of the specified solvents, i.e., ethylene glycol, the mono methyl or mono ethyl ethers thereof or diethylene glycol as the vehicle for the solution is essential to the provision of the concentrated dye solutions of this invention. Thus, various other closely related solvents have been tried and found to be unsuitable because the dye is either not sufficiently soluble initially or the solutions formed are not sufficiently stable.

A full understanding of the invention will be had from the following illustrative examples.

EXAMPLE 1

Preparation of Ethyl Auramine

A mixture of 124 parts of ethylmethane base (tetraethyldiaminodiphenylmethane) and 300 parts of urea was heated to 120° C., with stirring under an anhydrous ammonia atmosphere. Thirty-nine parts of sulfamic acid were then added and bubbling of ammonia gas through the entire mixture started. The bubbling of ammonia was continued throughout the reaction period up to the drowning step below. The mixture was then heated gradually to 155° C., (over ½ hour) and 26 parts sulfur added. After stirring one hour more at the same temperature, an additional 13 parts portion of sulfur were added. After stirring 2 ½ hours longer at 155° C., the temperature was increased gradually to 175° C., (over a 2 hour period) and then held at that temperature for ½ hour.

The whole molten mass was then drowned in 7,000 parts water at 65° C. containing 9 parts acetic acid and 75 parts of filter aid. After stirring at 65–67° C. for 10 minutes the solid was isolated by a vacuum filtration and the filter cake washed with 1,000 parts water at room temperature leaving an insoluble "tar cake." The mother liquors and the washes were then combined with 700 parts sodium chloride plus 10 parts dry ethyl auramine as seed. After cooling to room temperature the precipitated ethyl auramine product was isolated by filtration. The moist filter cake was then washed with a dilute (2 percent) sodium chloride solution and the dye dried at 120° C. to a water content of 0.4 percent.

EXAMPLE 2

A solution was prepared by mixing at room temperature in a closed vessel 36.3 grams of ethyl auramine prepared as described in example 1 and 63.7 grams of ethylene glycol. Addition of 2 ml. of the fresh solution to 100 ml. of water at 135° F., gave a clear solution without insoluble material. After standing at room temperature for five weeks, the concentrated solution showed no precipitation of solid material. Upon addition of 2 ml. of the stored concentrated solution to 100 ml. of water at 135° F., no significant turbidity or sediment formation was observed. Accordingly, this solution is highly suitable for commercial use.

EXAMPLES 3–5

After the fashion of Example 2 three additional solutions examples 3 –5) containing 25.5 percent, 30.0 percent and 25.6 percent real ethyl auramine, were prepared using as solvents diethylene glycol, the monomethyl ether of ethylene glycol and the monoethyl ether of ethylene glycol, respectively. All three solutions were tested as in example 2 and found to exhibit similar stability to that of the example 2 —solution.

Attempts to prepare similarly stable concentrated solutions of the dye using glycerol, propylene glycol, polypropylene glycol-400, polyethylene glycol-200 and tetraethylene glycol proved unsuccessful, the solutions being either unclear to start with or forming substantial amounts of insoluble material in a short time, i.e., a few hours to several days.

EXAMPLES 6–10

A series of concentrated solutions (examples 6 –10) of ethyl auramine in ethylene glycol were prepared having various amounts of water present. The series was prepared by making a concentrated master solution, and then carefully adding the desired amounts of water to portions of the solution. The solutions were then allowed to stand in sealed bottles at room temperature and periodically sampled and analyzed. The results are shown in table I. As will be seen from the table, even after being stored for 98 days, none of the solutions showed any significant loss in dye strength. Furthermore, the stored solutions remained clear with no formation of solid deposits. Also, all of the solutions successfully met the "dilute solubility test."

TABLE I.—SOLUTIONS OF ETHYL AURAMINE IN ETHYLENE GLYCOL

| Example No. | Analyses, percent | | | | | | |
|---|---|---|---|---|---|---|---|
| | Initial | | After 28 days | | After 52 days | | After 98 days, real dye |
| | Real dye | $H_2O$ | Real dye | $H_2O$ | Real dye | $H_2O$ | |
| 6 | 37.5 | 0.1 | 37.6 | 0.47 | 37.0 | 0.17 | 37.0 |
| 7 | 36.8 | 1.96 | 37.0 | 2.13 | 37.0 | 1.93 | 36.2 |
| 8 | 36.5 | 2.91 | 36.4 | 3.00 | 36.1 | 2.97 | 35.7 |
| 9 | 36.1 | 3.84 | 35.7 | 4.16 | 36.4 | 3.72 | 36.1 |
| 10 | 35.8 | 4.99 | 35.7 | 4.79 | 36.3 | 4.45 | 35.3 |

We claim:

1. An ethyl auramine dye solution comprised —essentially of ethyl auramine and a solvent selected from the group consisting of ethylene glycol, diethylene glycol, the monomethyl ether of ethylene glycol and the monoethyl ether of ethylene glycol; said solution containing from about 25 percent to about 40 percent real dye and less than about 5.0 percent water, based on the total weight of the solution.

2. An ethyl auramine dye solution according to Claim 1 containing a minor amount of a dispersing agent.

3. An ethyl auramine dye solution according to Claim 1 wherein said solvent is ethylene glycol.

4. An ethyl auramine dye solution according to Claim 1 wherein the solvent is diethylene glycol.

5. An ethyl auramine dye solution according to Claim 1 wherein the solvent is the monomethyl ether of ethylene glycol.

6. An ethyl auramine dye solution according to Claim 1 wherein the solvent is the monoethyl ether of ethylene glycol.